United States Patent Office 3,775,404
Patented Nov. 27, 1973

3,775,404
SYNTHESIS OF 13-ALKYL-6-CHLOROGONA-
4,6-DIEN-3-ONES
George C. Buzby, Jr., Philadelphia, and Herchel Smith,
Bryn Mawr, Pa., assignors to American Home Products Corporation, New York, N.Y.
No Drawing. Continuation-in-part of application Ser. No. 800,337, Jan. 31, 1969, which is a continuation of application Ser. No. 590,514, Oct. 31, 1966, both now abandoned. This application Sept. 9, 1969, Ser. No. 856,491
Int. Cl. C07c *173/00*
U.S. Cl. 260—239.55 R         10 Claims

ABSTRACT OF THE DISCLOSURE

This invention relates to 13-alkyl-17β-hydroxygona-4,6-dien-3-ones and their esters in which the 13-alkyl contains 2-5 carbon atoms, and to intermediates in their preparation. The products have anti-estrogenic activity combined with a wide separation between anti-estrogenic and progestational effects.

---

This application is a continuation-in-part of our application Ser. No. 800,337, filed Jan. 31, 1969, which was a continuation of our application Ser. No. 590,514, filed Oct. 31, 1966, and both now abandoned.

This invention relates to and has for its objects the provision of new physiologically active compounds, novel processes for their production and new intermediates useful in the preparation thereof.

More particularly, this invention relates to the 13-polycarbon alkyl compounds of the formula:

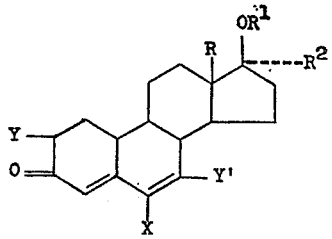

wherein X is halo, preferably, chloro, bromo and fluoro; Y and Y' are each selected from the group consisting of hydrogen and methyl; R is an alkyl group having from 2 to 5 carbon atoms; $R^1$ is selected from the group consisting of hydrogen and alkanoyl having fewer than 12 carbon atoms; and $R^2$ is selected from the group consisting of alkyl having less than 8 carbon atoms, lower alkynyl, halogen substituted lower alkynyl and trifluoromethyl substituted lower alkynyl.

Among the suitable acyls may be mentioned the acyl radical of a hydrocarbon carboxylic acid of less than 12 carbon atoms, as exemplified by the lower alkanoic acids (e.g., acetic, propionic, butyric, hexanoic and enanthic acid), the cycloalkane carboxylic acids (e.g., cyclobutane carboxylic acid), the monocyclic aromatic carboxylic acids (e.g., benzoic acid), and the monocyclic aryl lower alkonic acids (e.g., phenylacetic and β-phenylpropionic acid).

The term "lower alkynyl" refers to those having less than 8 carbon atoms such as ethynyl, propynyl, 1-butynyl, 2-butynyl, and the like.

Among the suitable halogen substituted alkynyls may be mentioned fluoroethynyl, chloroethynyl, 1-fluoropropynyl, 1-chloropropynyl, 1-fluorobutynyl, 1-bromobutynyl and the like. Among the suitable trifluoromethyl substituted lower alkynyls may be mentioned 1-trifluoromethylethynyl, 1-trifluoromethylpropynyl, and the like.

The alkyl groups mentioned included the straight chained and branched groups such as methyl, ethyl, propyl, isopropyl, butyl, isobutyl, and the like.

The final products of the invention are physiologically active substances which possess high anti-estrogenic activity and thus may be used for treatment of hyper-estrogenic states. Furthermore, the compounds show a wide separation between anti-estrogenic and progestational effects. Therefore, the compounds also may be used as microdose contraceptive agents.

The closest known prior art is disclosed in Switzerland Patent 390,243. The compounds of the present invention are distinguishable from the prior art compounds as described below in Example 11.

The compounds may be formulated for administration, the concentration and/or dosage being based on the activity of the particular compound and the requirements of the patient.

The compounds of this invention may be prepared by employing the novel processes of this invention which may be represented by the folowing reaction scheme wherein X, Y, Y', R, $R^1$ and $R^2$ are as hereinbefore defined:

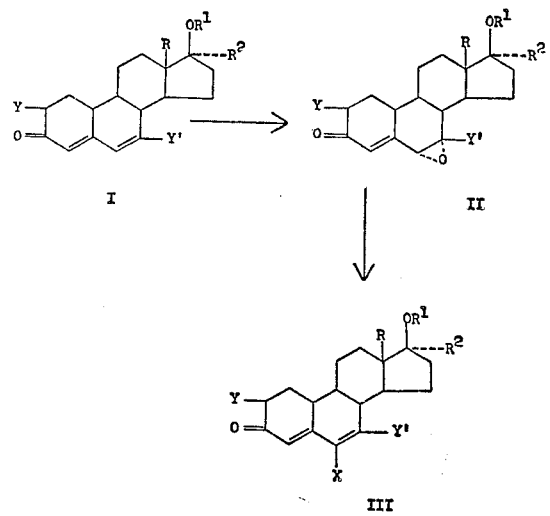

According to a feature of this invention compounds of Formula I are treated with an organic peracid, such as perbenzoic acid, haloperbenzoic acid, perphthalic acid and per(lower alkanoic) acids, in an inert medium, to yield inter alia, the 6α,7α-epoxide compound of Formula II.

These 6α,7α-epoxide compounds are then interacted with a hydrogen halide in an inert medium, such as acetic acid, to yield the 6-halo compounds of Formula III, which are the final products of this invention.

The starting materials for the final products are either known compounds or are prepared from known compounds by methods well known in the art.

The following scheme, wherein $R^2$ is as described above, shows the structures of the starting materials and depicts their methods of preparation:

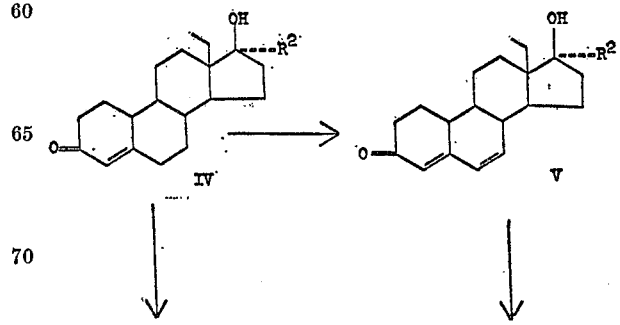

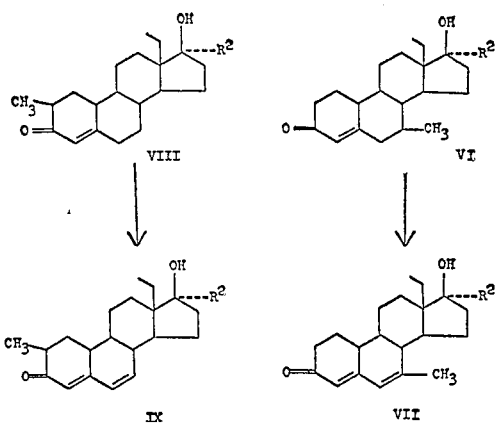

The preparation of compounds having structure V, the 4,6-gonadien-3-one compounds, is shown in an article by Buzby et al. in the Journal of Medicinal Chemistry, volume 9, page 782 (1966), and in Buzby et al. "Proceedings of the Second International Congress on Hormonal Steroids," 1966, Excerpta Medica International Congress Series, No. 132, page 311 ff.

Compound VII, a 7-metthyl-gona-4,6-dien-3-one may be prepared from Compound VI, a 7-methyl-gon-4-en-3-one by the procedure described in J. Med. Chem. supra. and Excerpta Medica No. 132 supra.

Compound IX can be prepared by first introducing a 2-methyl group into a gon-4-en-3-one of Compound IV as described in United States Patent 2,997,488, and then introducing a double bond at the 6-position as described in J. Med. Chem. supra. and Excerpta Medica No. 132 supra.

Compounds IV and VI are disclosed in J. Med. Chem. supra and Excerpta Medica No. 132 supra.

The following examples illustrate the invention (all temperatures being in centigrade):

EXAMPLE 1

13β-ethyl-6-chloro-17α-ethynyl-17β-hydroxygona-4,6-dien-3-one, acetate (A) Preparation of 13β-ethyl-6α,7α-epoxy-17α-ethynyl-17β-hydroxygon-4-en-3-one, acetate.—1.05 gm. of 13β-ethyl-17α-ethynyl-17β-hydroxygona-4,6-dien-3-one, acetate is dissolved in 50 ml. of methylene chloride containing 0.97 gm. of m-chloroperbenzoic acid. The mixture is allowed to stand in the dark for 24 hours and then washed with saturated sodium carbonate solution, water and brine. The organic layer is separated, dried and the solvent removed by evaporation in vacuo to yield 13β-ethyl-6α,7α-epoxy-17α-ethynyl-17β-hydroxygon-4-en-3-one, acetate as a white glass.

$\lambda_{max.}^{EtOH}$ 240 m$\mu$. $\lambda_{max.}^{NaCl}$ 3.05, 5.75, 6.0$\mu$.

(B) Preparation of 13β-ethyl-6-chloro-17α-ethynyl-17β-hydroxygona-4,6-dien-3-one, acetate.—The crude epoxide was dissolved in 50 ml. of acetic acid, saturated with hydrogen chloride gas and allowed to stand at room temperature for 3 hours. The reaction mixture is then poured into water and extracted with ether. The ether layer is washed with water, saturated sodium bicarbonate solution, water and brine. The solvent was removed in vacuo to yield 0.8 gm. of 13β-ethyl-6-chloro-17α-ethynyl-17β-hydroxygona-4,6-dien-3-one, acetate as a yellow gum.

$\lambda_{max.}^{NaCl}$ 2.92, 3.02, 5.75, 6.0, 6.25$\mu$; $\lambda_{max.}^{EtOH}$ 240 m$\mu$ and 286 m$\mu$ Chromatography of the gum on 40 gm. of Grade II neutral alumina yielded on elution with 10% hexane-benzene followed by recrystallization from ether-hexane the pure product having a melting point of 198–200°, $\lambda_{max.}^{KBr}$ 3.1, 5.74, 6.25, 6.32$\mu$, $\lambda_{max.}^{EtOH}$ 287 m$\mu$ ($\epsilon$=23,300)

Analysis.—Calcd. for $C_{23}H_{27}O_3Cl$ (percent): Cl, 9.16. Found (percent): Cl, 9.86.

Similarly, following the procedure of Example IB, but substituting hydrogen fluoride or hydrogen bromide for hydrogen chloride, there is obtained 13β-ethyl-6-fluoro-17α-ethylyl-17β-hydroxygona-4,6-dien-3-one, acetate and 13β - ethyl-6-bromo-17α-ethynyl-17β-hydroxygona-4,6-dien-3-one, acetate, respectively.

EXAMPLE 2

13β-propyl-6-chloro-17α-ethynyl-17β-hydroxygona-4,6-dien-3-one, acetate

Following the procedure of Example 1, but substituting 13β-propyl-17α-ethynyl-17β-hydroxygona-4,6-dien-3 - one, acetate for 13β-ethyl - 17α - ethynyl-17β-hydroxygona-4,6-dien-3-one, acetate there is obtained 13β-propyl-6-chloro-17α-ethynyl-17β-hydroxygona-4,6-dien-3-one, atecate.

EXAMPLE 3

13β,17α-diethyl-6-chloro-17β-hydroxygona-4,6-dien-3-one, acetate

Following the procedure of Example 1 but substituting 13β,17α-diethyl-17β-hydroxygona-4,6-dien-3-one, acetate for 13β-ethyl-17α-ethynyl-17β-hydroxygona-4,6-dien-3-one, acetate there is obtained 13β,17α-diethyl-6-chloro-17β-hydroxygona,4,6-dien-3-one, acetate.

EXAMPLE 4

13β-ethyl-17α-propyl-6-chloro-17β-hydroxygona-4,6-dien-3-one, acetate

Following the procedure of Example 1, but substituting 13β-ethyl-17α-propyl-17β-hydroxygona-4,6-dien-3-one, acetate for 13β-ethyl-17α-ethynyl-17β-hydroxygona-4,6-dien-3-one, acetate there is obtained 13β-ethyl-17α-propyl-6-chloro-17β-hydroxygona-4,6-dien-3-one, acetate.

EXAMPLE 5

2-methyl-6-chloro-17α-chloroethynyl-13β-ethyl-17β-hydroxygona-4,6-dien-3-one, acetate Following the procedure of Example 1 but substituting 2-methyl-17α-chloroethynyl - 13β-ethyl-17β-hydroxygona-4,6-dien-3-one, acetate for 13β-ethyl-17α-ethynyl-17β-hydroxygona-4,6-dien-3-one, acetate, there is obtained 2-methyl-6-chloro-17α-chloroethynyl-13β - ethyl - 17β - hydroxygona-4,6-dien-3-one, acetate.

EXAMPLE 6

7-methyl-13β-ethyl-6-chloro-17α-ethynyl-17β-hydroxygona-4,6-dien-3-one, butyrate Following the procedure of Example 1 but substituting 7-methyl-13-ethyl-17α-ethynyl-17β-hydroxygona-4,6-dien-3-one, butyrate for 13β,17α-ethynyl-17β-hydroxygona-4,6-dien-3-one, acetate there is obtained 7-methyl-13β-ethyl-6-chloro-17α-ethynyl-17β-hydroxygona-4,6-dien-3-one, butyrate.

EXAMPLE 7

13β-ethyl-6-chloro-17α-ethynyl-17β-hydroxygona-4,6-dien-3-one 1.0 gm. of 13β-ethyl-17α-ethynyl-17β-hydroxygona-4,6-diene-3-one is dissolved in 50 ml. of methylene chloride containing 0.95 gm. of m-chlorobenzoic acid and the mixture is permitted to stand in the dark for 24 hours. The mixture is then washed with saturated sodium carbonate solution, water and brine. The organic layer is separated, dried and the solvent is removed by evaporation in vacuo to yield the crude residue 13β-ethyl-6α,7α-epoxy-17α-ethynyl-17β-hydroxygona-4-en-3-one.

50 ml. of glacial acetic acid saturated with hydrogen chloride is added to the crude epoxide. The reaction mixture is permitted to remain at room temperature for 3 hours and then water is added and the mixture is extracted with ether. The organic phase is washed with water, saturated sodium bicarbonate solution and brine. The solvent is evaporated in vacuo and the remaining residue is chromatographed on Grade II neutral alumina with hexane-benzene. The solvent is removed from the eluate to yield 13β-ethyl-6-chloro-17α-ethynyl - 17β - hydroxygona - 4,6-dien-3-one.

Similarly, by following the procedure of Example 7, but substituting hydrogen fluoride for hydrogen chloride there is obtained 13β - ethyl-fluoro-17α-ethylnyl-17β-hydroxygona-4,6-dien-3-one.

EXAMPLE 8

13β-isobutyl-6-chloro-17α-ethynyl-17β-hydroxygona-4,6-dien-3-one

Following the procedure of Example 7, but substituting 13β - isobutyl-17α-ethynyl-17β-hydroxygona-4,6-dien -3 - one for 13β-ethyl-17α-ethynyl-17β-hydroxygona-4,6-dien-3-one there is obtained 13β-isobutyl-6-chloro-17α-ethynyl-17β-hydroxygona-4,6-dien-3-one.

EXAMPLE 9

6-chloro-17α-chloroethynyl-13β-ethyl-17β-hydroxygona-4,6-dien-3-one

Following the procedure of Example 7 but substituting 17α-chloroethynyl - 13β-ethyl-17β-hydroxygona-4,6-dien-3-one for 13β-ethyl-17α-ethynyl - 17β-hydroxygona-4,6-dien-3-one there is obtained 6-chloro-17α-chloroethynyl-13β-ethyl-17β-hydroxygona-4,6-dien-3-one.

EXAMPLE 10

6-chloro-17α-trifluoromethylethynyl-13β-ethyl-17β-hydroxygona-4,6-dien-3-one

Following the procedure of Example 7, but substituting 17α-trifluoromethylethynyl - 13β - ethyl-17β-hydroxygona-4,6-dien-3-one for 13β-ethyl-17α-ethynyl-17β-hydroxygona - 4,6 - dien-3-one there is obtained 6-chloro-17α-trifluoromethylethynyl-13β-ethyl - 17β - hydroxygona-4,6-dien-3-one.

It is understood that either the dl-steroids or specific d- or l-isomers may be employed as starting material with like results.

EXAMPLE 11

The following illustrates the distinction between the present invention and the prior art.

In the following procedure Compound A is 13β-ethyl-6 - chloro 17α - ethynyl - 17β - hydroxygona - 4,6-dien-3-one, acetate, the compound of Example 1, and Compound B is 6-chloro-17-hydroxy-17α-pregna-4,6-dien-20-yn-3-one, acetate, a compound disclosed in Bruckner's Switzerland Patent 390,243.

Anti-estrogenic properties are determined by the mouse vaginal smear procedure using progesterone as a standard. In the procedure, 2 micrograms of estrone are administered simultaneously with each of the test compounds in four equal parts over four days. Vaginal smears are taken on the afternoon of the fifth day and in the morning of the sixth day. Active compounds reduce the proportion of mice responding to the estrone with cornified vaginal epithelia (Edgren, Acta endocrinologica, 39:536–542, 1960).

Androgenic and anabolic properties are determined using testosterone propionate as a standard. In the procedure, test compounds are administered for seven days to young, castrated male rats. Active compounds produce increases in weights of ventral prostate (VP) gland, seminal vesicles (SV) and levator ani muscle (LA). Androgenic potency is evaluated from changes in weights of prostrate or seminal vesicle, metrotropic potency from changes in weights of levator ani muscles. (Hershberger, Shipley and Meyer, Proc. Soc. Exp. Biol. and Med., 83:175, 1953).

The progestational properties are determined using progesterone as a standard. In the procedure immature female rabbits are primed wtih estradiol-17β for six days. The primed rabbits then receive test compound daily for five days before autopsy on the sixth. Progestational activity is assessed by histological evaluation of uterine glandular proliferation (Elton and Edgren, Endocrinology, 63:464–472, 1958).

The results of the above testing were as follows:

| | Anti-estrogenic, percent | Androgenic, percent | Anabolic, percent | Progestational, percent | Anti-estrogenic/progestational |
|---|---|---|---|---|---|
| A | 300 | 10 | 4.0 | 25 | 12 |
| B | 45 | 10 | 3.5 | 140 | 0.3 |

The test results indicate that: (a) Compound A is almost seven times more potent than Compound B as an anti-estrogen, (b) Compound A is almost six times less potent than Compound B as a progestin, and (c) further, the high anti-estrogenic/progestational ratio (300/25=12) for Compound A is clearly superior to that of Compound B.

The invention may be variously otherwise embodied within the scope of the appended claims.

What is claimed is:

1. A compound of the formula:

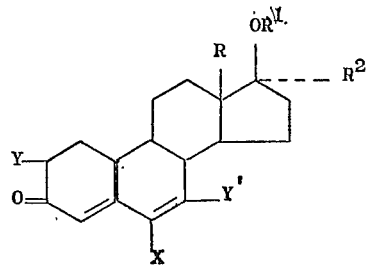

wherein X is halo; Y and Y' are each selected from the group consisting of hydrogen and methyl; R is an alkyl group having from 2 to 5 carbon atoms; $R^1$ is selected from the group consisting of hydrogen and alkanoyl containing fewer than 12 carbon atoms and $R^2$ is alkyl having less than 8 carbon atoms, or lower alkynyl, with the proviso that Y' may not be methyl when Y is methyl.

2. A compound according to claim 1 that is 13β-lower alkyl-6-halo-17α-lower alkynyl-17β-hydroxygona-4,6-dien-3-one, acylate.

3. A compound according to claim 2 that is 13β-ethyl-6-chloro - 17α - ethynyl - 17β - hydroxygona-4,6-dien-3-one, acetate.

4. A compound according to claim 1 that is 13β-lower alkyl-6-halo-17α-lower alkynyl-17β-hydroxygona-4,6-dien-3-one.

5. A compound according to claim 4 that is 13β-ethyl-6-chloro-17α-ethynyl-17β-hydroxygona-4,6-dien-3-one.

6. A compound according to claim 1 that is 13β,17α-di(lower alkyl)-6-halo-17β-hydroxygona-4,6-dien-3-one.

7. A compound according to claim 6 that is 13β,17α-diethyl-6-halo-17β-hydroxygona-4,6-dien-3-one.

8. A compound according to claim 1 that is 2-methyl-13β-ethyl-6-chloro-17α-ethynyl - 17β - hydroxygona-4,6-dien-3-one, acetate.

9. A compound of the formula:

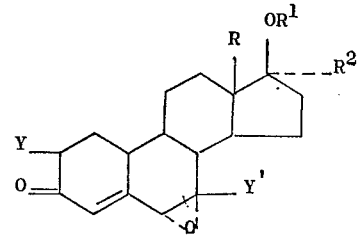

wherein Y and Y' are each selected from the group consisting of hydrogen and methyl; R is an alkyl group having from 2 to 5 carbon atoms; $R^1$ is selected from the group consisting of hydrogen and alkanoyl containing fewer than 12 carbon atoms; and $R^2$ is alkyl of less than 8 carbon atoms or lower alkynyl, with the proviso that Y' may not be methyl when Y is methyl.

10. A compound of the formula

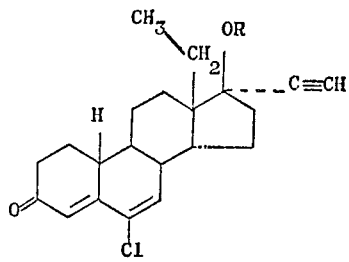

wherein R is selected from the group consisting of hydrogen or a carboxylic acid group containing fewer than 12 carbon atoms.

References Cited
UNITED STATES PATENTS

| | | | |
|---|---|---|---|
| 3,096,353 | 7/1963 | Fried et al. | 260—397.4 |
| 3,498,975 | 3/1970 | Oberster et al. | 260—239.55 |
| 3,513,164 | 5/1970 | Cross et al. | 260—239.55 |

HENRY A. FRENCH, Primary Examiner

U.S. Cl. X.R.

260—397.4; 424—243